(12) United States Patent
Lai

(10) Patent No.: US 8,572,861 B2
(45) Date of Patent: Nov. 5, 2013

(54) PIVOTAL MEASURING WHEEL

(75) Inventor: Yin-Wu Lai, Taichung (TW)

(73) Assignee: Chih-Yi Chen, Tongluo Township, Miaoli County (TW)

( * ) Notice: Subject to any disclaimer, the term of this patent is extended or adjusted under 35 U.S.C. 154(b) by 206 days.

(21) Appl. No.: 13/304,876

(22) Filed: Nov. 28, 2011

(65) Prior Publication Data

US 2013/0133212 A1    May 30, 2013

(51) Int. Cl.
*G01B 3/12* (2006.01)
(52) U.S. Cl.
USPC .................................. 33/779; 33/781; 33/782
(58) Field of Classification Search
USPC ..................................................... 33/772–782
See application file for complete search history.

(56) References Cited

U.S. PATENT DOCUMENTS

| 4,176,458 | A * | 12/1979 | Dunn | 33/781 |
| 7,040,036 | B1 * | 5/2006 | Wang | 33/782 |
| 7,111,412 | B2 * | 9/2006 | Huang | 33/772 |
| 7,131,216 | B2 * | 11/2006 | Nepil | 33/772 |
| 7,536,805 | B1 * | 5/2009 | Tang | 33/782 |
| 7,555,846 | B1 * | 7/2009 | Wang | 33/772 |
| 7,694,431 | B2 * | 4/2010 | Tang | 33/772 |
| 2007/0084076 | A1 * | 4/2007 | Wang | 33/772 |
| 2008/0148591 | A1 * | 6/2008 | Kao Lin | 33/772 |
| 2010/0024236 | A1 * | 2/2010 | Tang | 33/782 |

* cited by examiner

*Primary Examiner* — Christopher Fulton
(74) *Attorney, Agent, or Firm* — patenttm.us

(57) ABSTRACT

A pivotal measuring wheel includes a handle set, a handle rod, a pivotal rod, a wheel seat, a wheel and a cable. The handle rod has a hollow handle seat and an arc-contoured first pivotal body. The first pivotal body has a first space and a first semi-circular hole communicating with the first space. The pivotal rod has a hollow joint seat and an arc-contoured second pivotal body for connecting to the first pivotal body. The second pivotal body has a second space and a second semi-circular hole communicating with the second space. The second space selectively communicates with the first space. The second semicircular hole selectively aligns and communicates with the first semicircular hole. The handle seat is freely pivotable relative to the joint seat without disturbing the cable.

19 Claims, 8 Drawing Sheets

PIVOTAL MEASURING WHEEL

BACKGROUND OF THE INVENTION

1. Field of the Invention

The present invention relates to a measuring device, and more particularly to a pivotal measuring wheel.

2. Description of Related Art

With reference to FIGS. 7 and 8, a conventional measuring wheel includes a handle and a controller connecting to the handle. A first rod 90 has two ends respectively connected to the handle and pivotally connected to a second rod 91. The second rod 91 is rotatably connected to a wheel. Two cables 92 extend from the controller to the second rod 91 via the first rod 90 for measuring a rotational displacement of the wheel. The first rod 90 has two receiving slots 93 defined in the end of the first rod 90, which is connected to the second rod 91. The second rod 91 has two loading slots 94 defined in the end of the second rod 91, which is connected to the first rod 90. The two receiving slots 93 respectively communicate with the two loading slots 94. The two cables 92 are received in the two receiving slots 93 and the two loading slots 94 to prevent the cables 92 from being cut, such that the first rod 90 is pivotable relative to the second rod 91. However, the cables 92 are exposed on the first rod and the second rod and are easily stained by the environmental moisture such that the cables may not work properly.

Another conventional measuring wheel changes a connection between the first rod and the second rod, such that the first rod is sleeved on the second rod. The first rod is telescopically moved relative to the second rod for storage and easy carrying. However, the cables in the first rod and the second rod cannot be telescopically retracted and are folded in the first rod and the second rod. The cables are easily inserted between the first rod and the second rod and are easily worn and broken.

To overcome the shortcomings, the present invention tends to provide a measuring wheel to mitigate or obviate the aforementioned problems.

SUMMARY OF THE INVENTION

The main objective of the invention is to provide a pivotal measuring wheel that includes a handle set, a handle rod, a pivotal rod, a wheel seat, a wheel and a cable. The handle set includes a handle and a panel mounted on the handle. The handle rod is mounted on the handle set and has a hollow handle seat mounted on one end of the handle rod. The handle seat has an arc-contoured first pivotal body protruding from the handle seat. The first pivotal body has a first space defined in one side of the first pivotal body and a first semicircular hole defined in the side of the first pivotal body and communicating with the first space. The pivotal rod has a hollow joint seat mounted on one end of the pivotal rod and is pivotally connected to the joint seat of the pivotal rod. The joint seat has an arc-contoured second pivotal body protruding from the joint seat for connecting to the first pivotal body of the handle seat. The second pivotal body has a second space defined in one side of the second pivotal body and a second semicircular hole defined in the side of the second pivotal body and communicating with the second space. The second space in the second pivotal body selectively communicates with the first space in the first pivotal body. The second semicircular hole selectively correspondingly aligns and communicates with the first semicircular hole. The wheel seat is mounted on the pivotal rod and is located opposite to the end of the joint seat. The wheel is rotatably mounted on the wheel seat. The cable connects the panel to the wheel seat and is mounted through the handle rod and the pivotal rod via the first space, the first semicircular hole, the second space, and the second semicircular hole.

Other objects, advantages and novel features of the invention will become more apparent from the following detailed description when taken in conjunction with the accompanying drawings.

DETAILED DESCRIPTION OF PREFERRED EMBODIMENT

Figure 1:
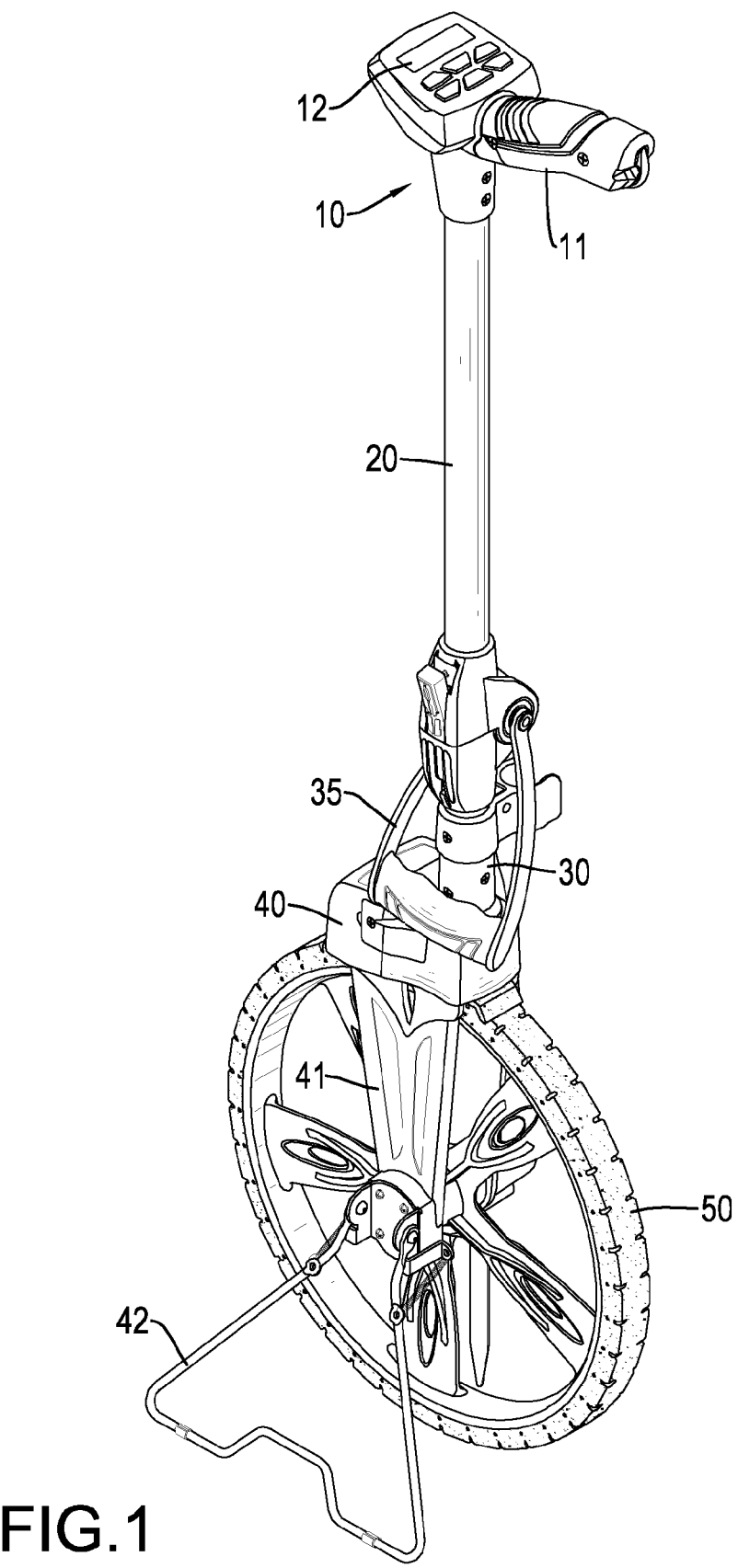
FIG. 1 is a perspective view of a pivotal measuring wheel in accordance with the present invention.
Figure 2:
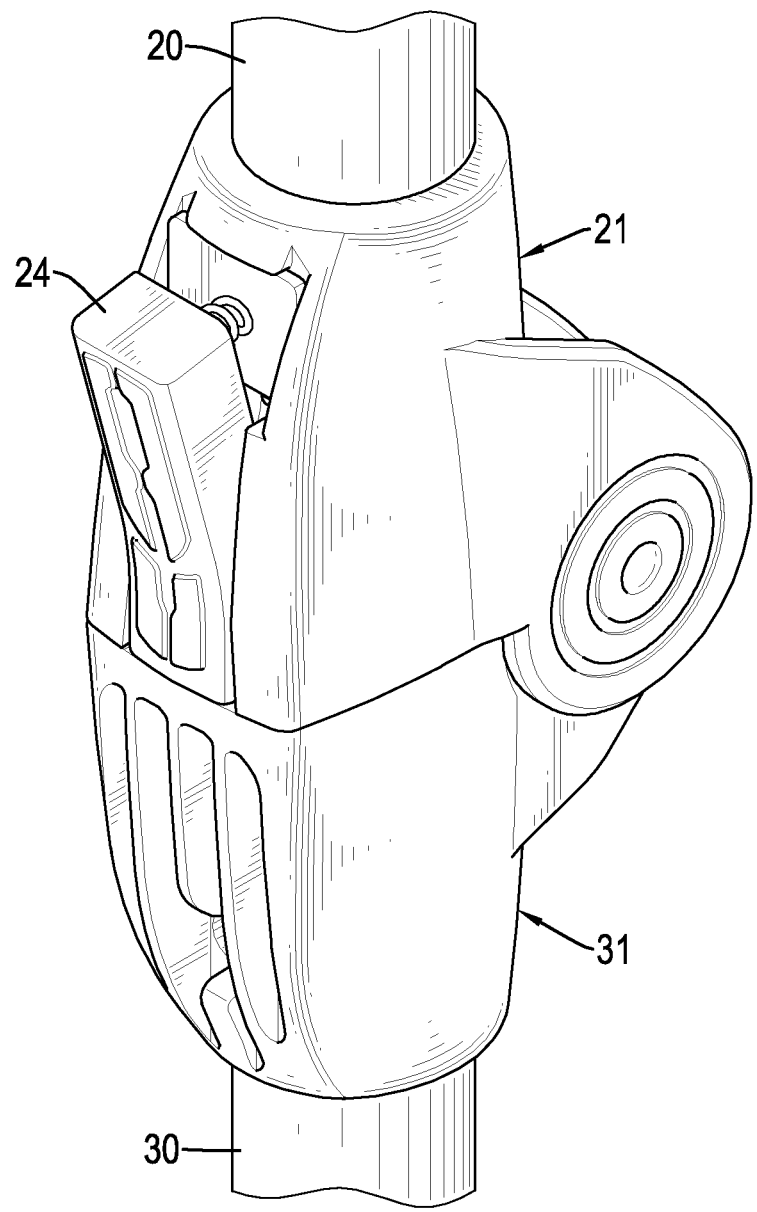
FIG. 2 is an enlarged perspective view of a handle seat and a joint seat of the pivotal measuring wheel in FIG. 1.
Figure 3:
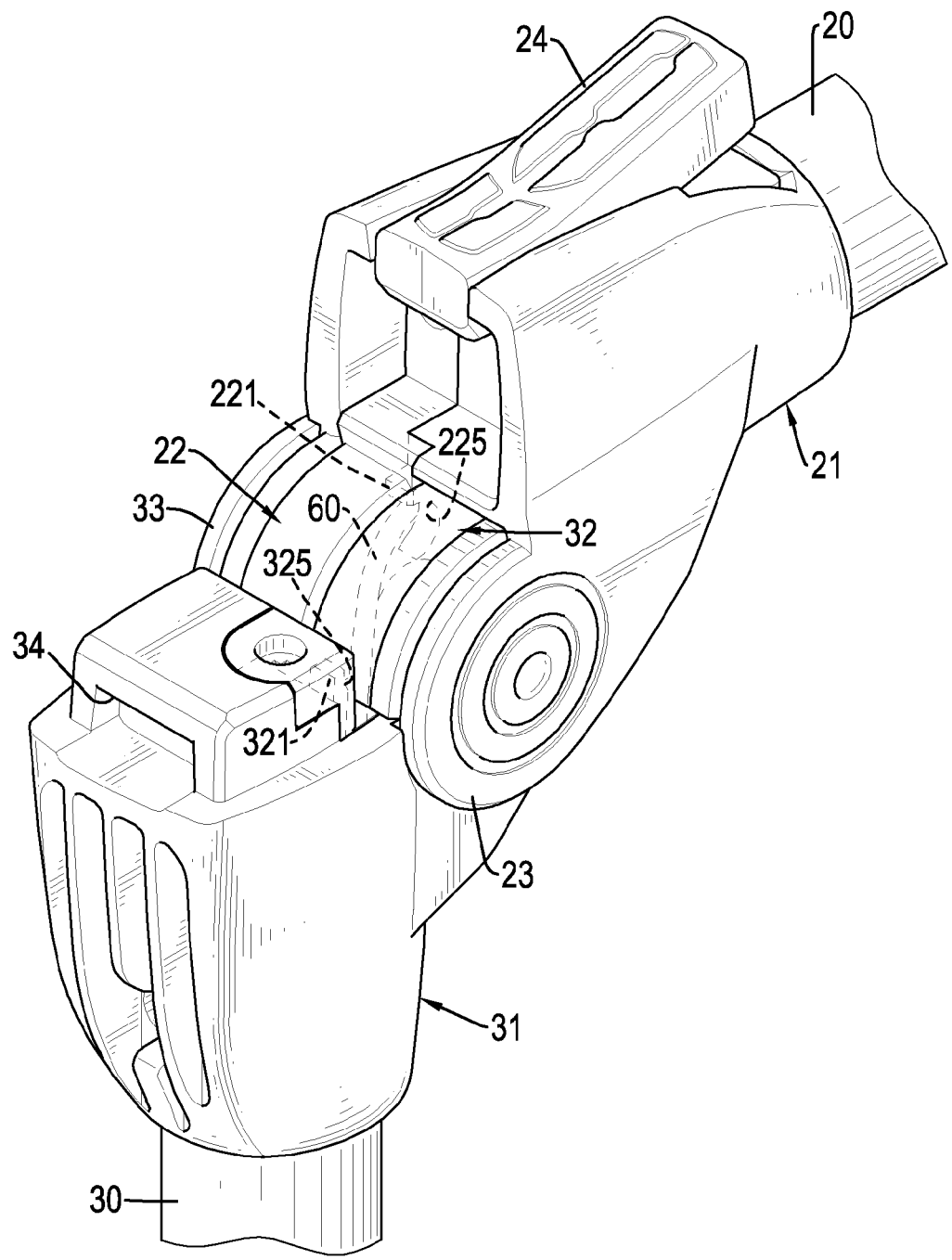
FIG. 3 is an operational perspective view of the handle seat and the joint seat in FIG. 2.

With reference to FIGS. 1 to 3, a pivotal measuring wheel in accordance with the present invention comprises a handle set 10, a handle rod 20, a pivotal rod 30, a wheel seat 40, a wheel 50 and a cable 60.

The handle set 10 includes a handle 11 and a panel 12 mounted on the handle 11. Preferably, the panel 12 can be an electrical control panel or a mechanical displaying panel.

Figure 4:
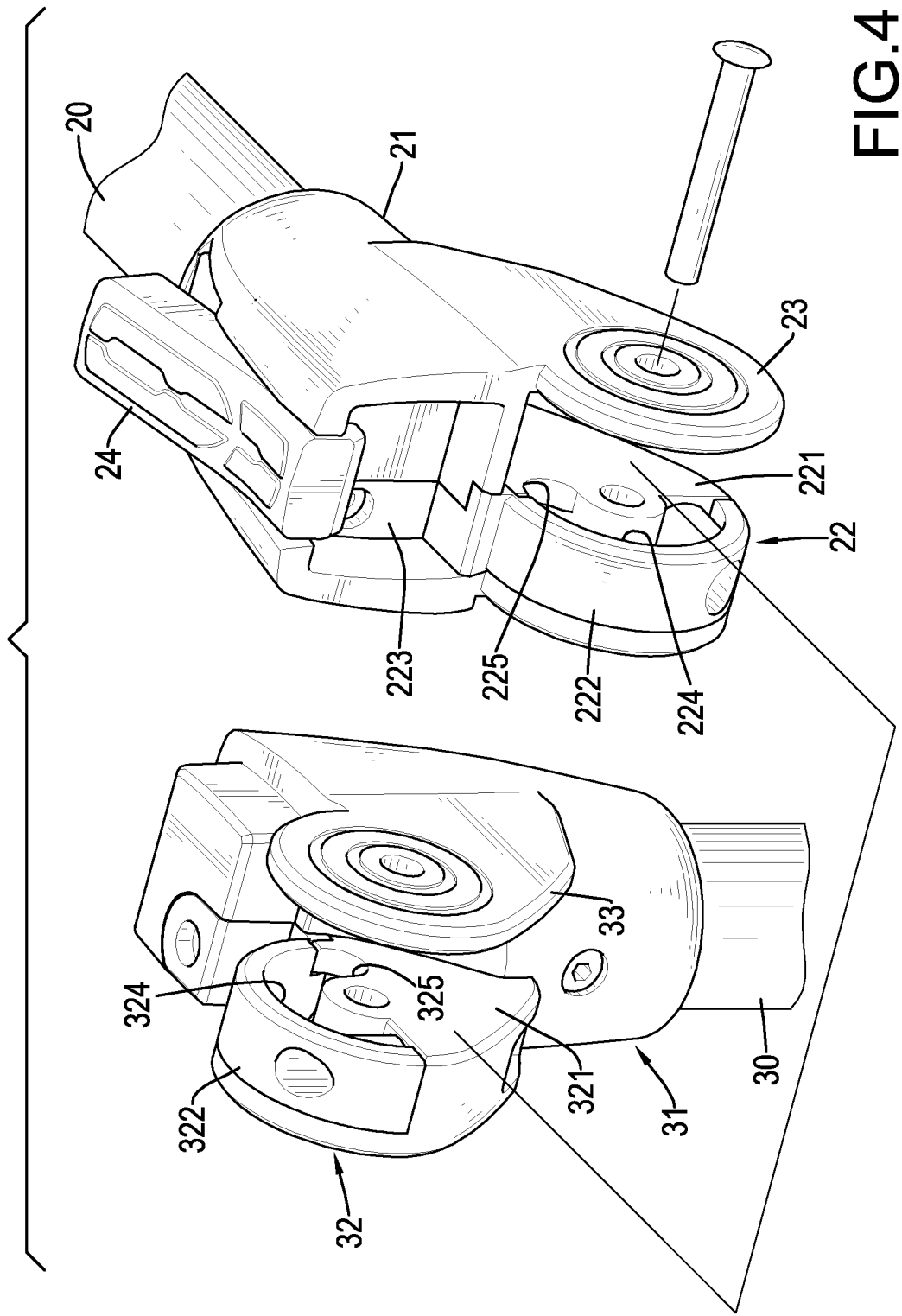
FIG. 4 is an exploded perspective view of the handle seat and the joint seat in FIG. 3.

With further reference to FIG. 4, the handle rod 20 has two ends. One end of the handle rod 20 is mounted on the handle 11 of the handle set 10 and the other end of the handle rod 20 has a hollow handle seat 21 mounted on the end of the handle rod 20. The handle seat 21 has a first pivotal body 22, a first sheet 23 and a locking member 24. The first pivotal body 22 has an arc contour and inclindedly protrudes from the handle seat 21. The first pivotal body 22 includes a first pivotal seat 221 and a first pivotal cap 222. The first pivotal seat 221 extends from the handle seat 21 and has a circular wall disposed on one side of the first pivotal seat 221. The first pivotal cap 222 has an arched contour and a first locking portion 223 extending from one end of the first pivotal cap 222. The first locking portion 223 is fastened on the first pivotal seat 221 with a screw. The arched contour of the first pivotal cap 222 matches with the circular wall of the first pivotal seat 221. The first pivotal cap 222, the first pivotal seat 221 and the circular wall of the first pivotal seat 221 enclose a first space 224 communicating with an interior of the hollow handle seat 21. The first pivotal seat 221 has a first semicircular hole 225 defined in the first pivotal seat 221 and communicating with the first space 224. The first pivotal sheet 23 extends from the handle seat 21 and is parallel to the first pivotal body 22. The locking member 24 is pivotally mounted on the handle seat 21.

Figure 5:
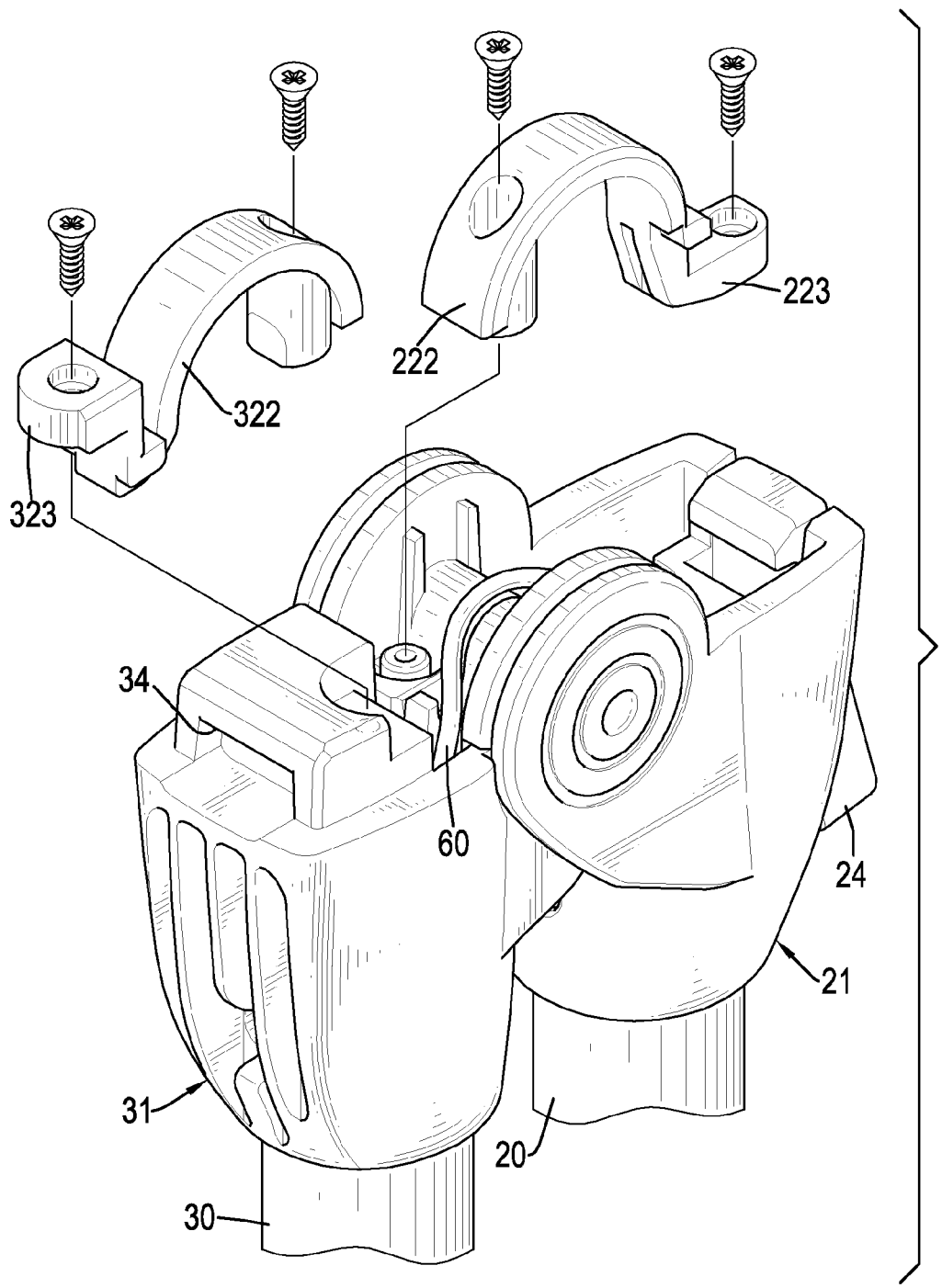
FIG. 5 is an exploded perspective view of the handle seat and the joint seat in FIG. 3.

With reference to FIGS. 3 to 5, the pivotal rod 30 has two ends. One end of the pivotal rod 30 is pivotally connected to the handle seat 21 of the handle rod 20 and the other end of the pivotal rod 30 has a hollow joint seat 31 mounted on the end of the pivotal rod 30. The joint seat 31 has a second pivotal body 32, a second pivotal sheet 33 and a locking recess 34. The second pivotal body 32 has an arc contour and inclindedly protrudes from the joint seat 31. The second pivotal body 32 is co-axially connected to the first pivotal body 22. The second pivotal body 32 has a second pivotal seat 321 and a second pivotal cap 322. The second pivotal seat 321 extends from the joint seat 31 and has a circular wall disposed on one side of the second pivotal seat 321. The second pivotal cap 322 has an arched contour and a second locking portion 323 extending from one end of the second pivotal cap 322. The second locking portion 323 is fastened on the second pivotal seat 321 with a screw. The arched contour of the second pivotal cap 322 matches with the circular wall of the second pivotal seat 321. The second pivotal cap 322, the second pivotal seat 321 and the circular wall of the second pivotal seat 321 enclose a second space 324 communicating with an interior of the hollow joint seat 31. The second space 324 selectively communicates with the first space 224. The second pivotal seat 321 has a second semicircular hole 325 defined in the second pivotal seat 321 and communicating with the second space 324. The second semicircular hole 325 selectively correspondingly aligns and communicates with the first semicircular hole 225. The second pivotal sheet 33 extends from the joint seat 31 and is parallel to the second pivotal body 32. The second pivotal body 32 is disposed between the first pivotal body 22 and the first pivotal sheet 23. The first pivotal body 22 is disposed between the second pivotal body 32 and the second pivotal sheet 33. The first pivotal sheet 23 abuts against the circular wall of the second pivotal body 32 and the second pivotal sheet 33 abuts against the circular wall of the first pivotal body 22. A pintle is mounted through the first pivotal sheet 23, the second pivotal body 32, the first pivotal body 22 and the second pivotal sheet 33, such that the joint seat 31 is pivotable relative to the handle seat 21 as a pivot of the pintle. The locking recess 34 is defined in the joint seat 31 for corresponding to the locking member 24. The locking member 24 is selectively inserted into the locking recess 34 for fixing a position of the handle seat 21 relative to the joint seat 31, such that the handle rod 20 co-axially aligns with the pivotal rod 30. When the locking member 24 is detached from the locking recess 34, the handle seat 21 is freely pivotable relative to the joint seat 31.

With reference to FIG. 1, a handlebar 35 has two ends respectively and pivotally connected to two ends of the pintle mounted between the handle seat 21 and the joint seat 31. The handlebar 35 is formed of rubber and is bendable.

The wheel seat 40 is mounted on the pivotal rod 30 and has two connecting plates 41 extending from the wheel seat 40. A measuring mechanism is mounted in the wheel seat 40 for detecting a rotational displacement of the wheel 50. A stand 42 is pivotally mounted on one of the two connecting plates 41 of the wheel seat 40 for providing a support.

The wheel 50 is rotatably mounted between the two connecting plates of the wheel seat 40.

Figure 6:
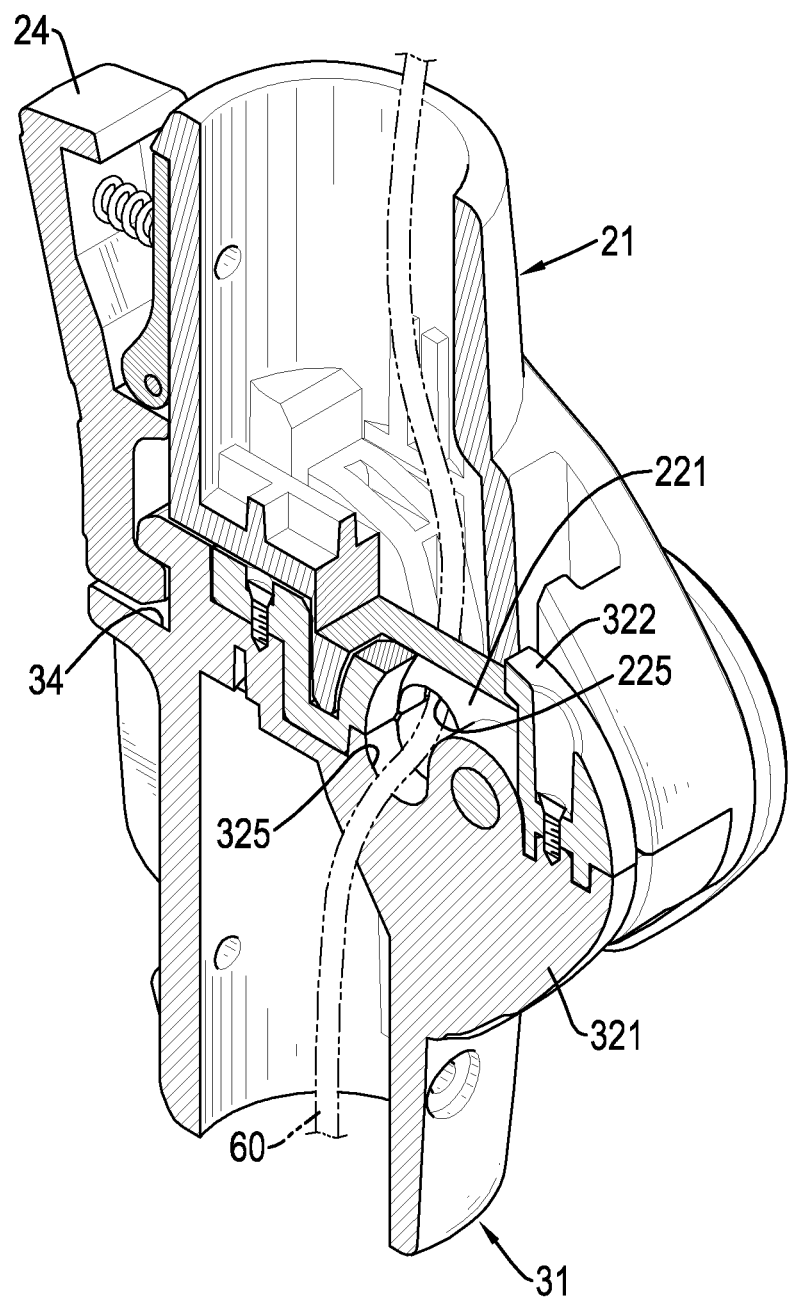
FIG. 6 is a cross-sectional perspective view of the handle seat and the joint seat in FIG. 2.
Figure 7:
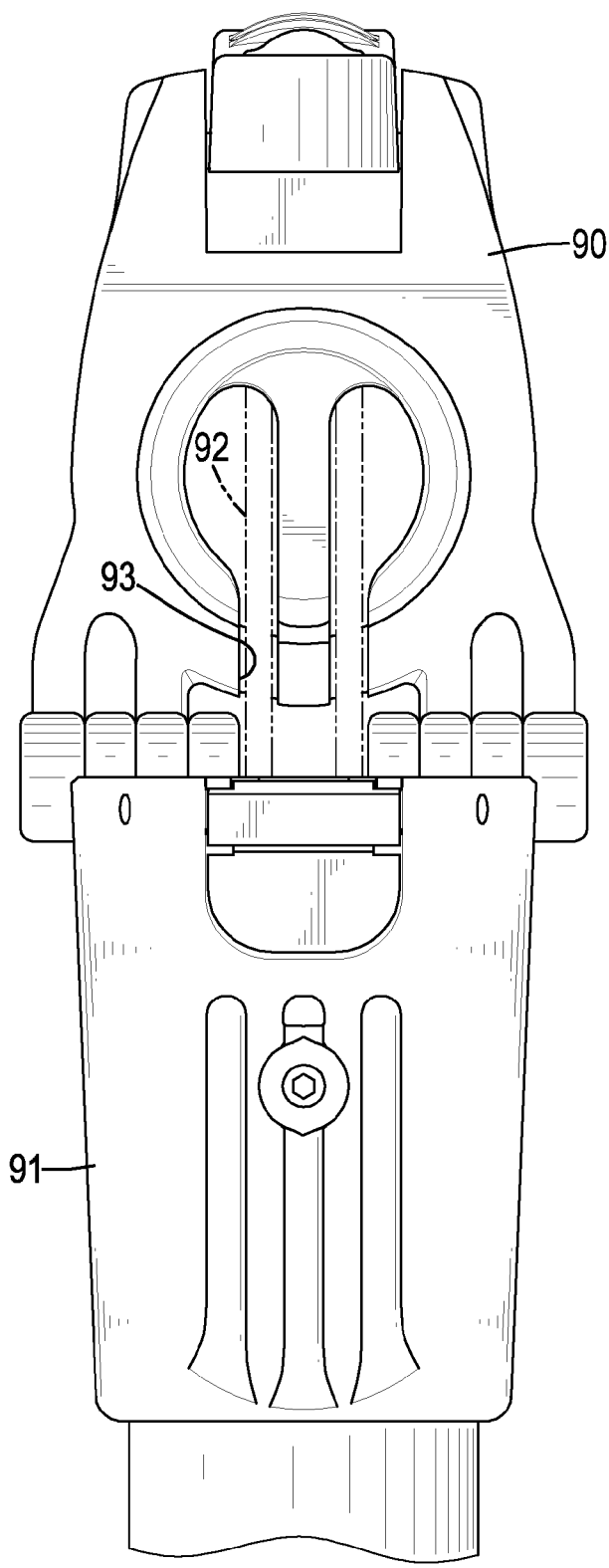
FIG. 7 is a side view of a first rod and a second rod of a conventional measuring wheel.
Figure 8:
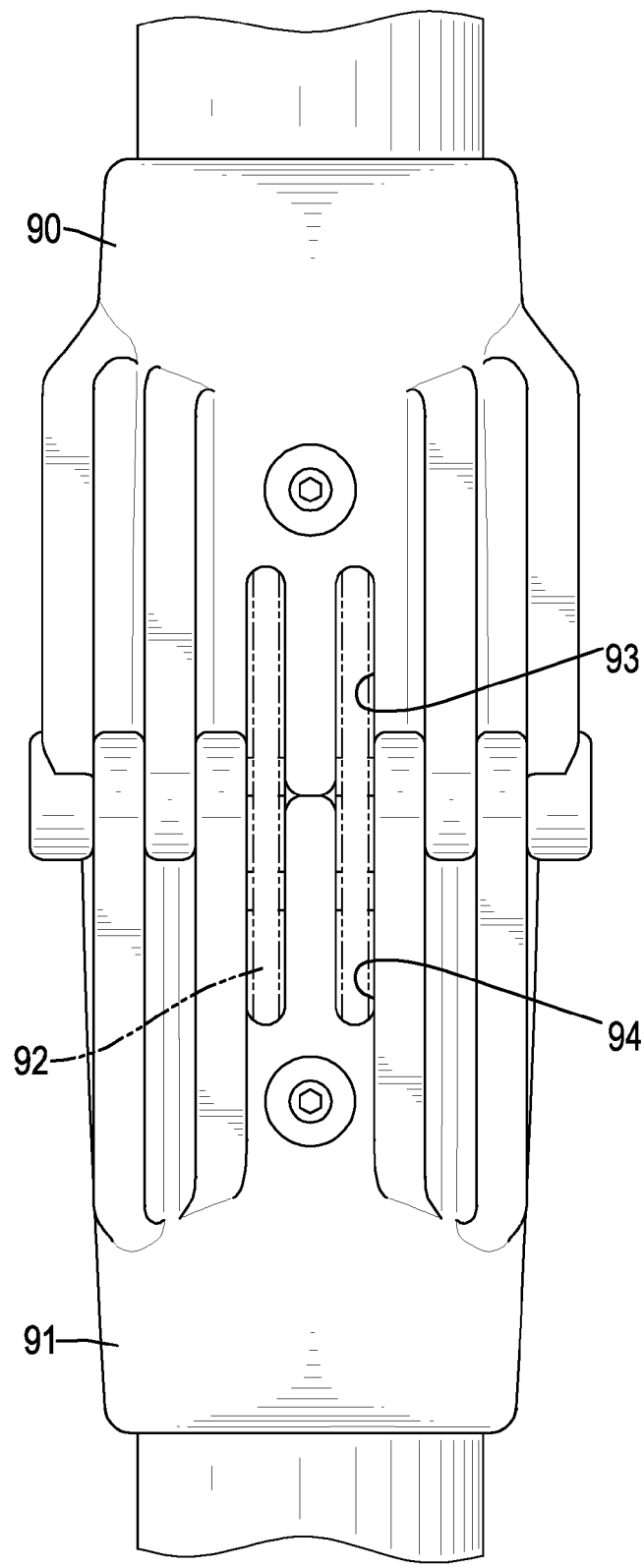
FIG. 8 is a side view of the first rod pivoted relative to the second rod in FIG. 7.

With reference to FIGS. 3, 5 and 6, the cable 60 depends on a design of the panel 12 and can be an electric wire or a pulling steel wire. The cable 60 connects the panel 12 to the wheel seat 40 and is mounted through the handle rod 20 and the pivotal rod 30 via the first space 224, the first semicircular hole 225, the second space 324, and the second semicircular hole 325.

With reference to FIG. 5, when the handle seat 21 is pivoted relative to the joint seat 31, the first space 224 communicates with the second space 324. The cable 60 is received in the first semicircular hole 225 and the second semicircular hole 325 and extends from the interior of the handle seat 21 to the interior of the joint seat 31.

With reference to FIG. 6, when the locking member 24 of the handle seat 21 is buckled in the locking recess 34 in the joint seat 31, the first space 224 is shielded by the second pivotal seat 321 and the second space is shielded by the first pivotal seat 221, such that the first space 224 does not communicate with the second space 324. The second semicircular hole 325 communicates and aligns to the first semicircular hole 225 in a position of the handle rod 20 aligning with the second rod 30 for receiving the cable 60. Therefore, the handle seat 21 is freely pivotable relative to the joint seat 31 without disturbing the cable 60. The cable 60 is kept shielding from exposing to an outer environment in any position of the handle rod 20 relative to the pivotal rod 30. The cable 60 is restricted in the handle rod 20, the handle seat 21, the first semicircular hole 225, the pivotal rod 30, the joint seat 31 and the second semicircular hole 325, such that the cable 60 won't be cut or worn during operations of the pivotal measuring wheel in according with the present invention.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pivotal measuring wheel comprising:
   a handle set including a handle and a panel mounted on the handle;
   a handle rod mounted on the handle set and having a hollow handle seat mounted on one end of the handle rod, the handle seat having an arc-contoured first pivotal body protruding from the handle seat, the first pivotal body having a first space defined in one side of the first pivotal body and a first semicircular hole defined in the side of the first pivotal body and communicating with the first space;
   a pivotal rod having a hollow joint seat mounted on one end of the pivotal rod and pivotally connected to the joint seat of the pivotal rod, the joint seat having an arc-contoured second pivotal body protruding from the joint seat for connecting to the first pivotal body of the handle seat, the second pivotal body having a second space defined in one side of the second pivotal body and a second semicircular hole defined in the side of the second pivotal body and communicating with the second space, the second space in the second pivotal body selectively communicating with the first space in the first pivotal body, the second semicircular hole selectively correspondingly aligning and communicating the first semicircular hole;
   a wheel seat mounted on the pivotal rod and located opposite to the end of the joint seat;
   a wheel rotatably mounted on the wheel seat; and
   a cable connecting the panel to the wheel seat and mounted through the handle rod and the pivotal rod via the first space, the first semicircular hole, the second space, and the second semicircular hole.

2. The pivotal measuring wheel as claimed in claim 1, wherein the first pivotal body includes a first pivotal seat extending from the handle seat and an arc-contoured first pivotal cap mounted on the first pivotal seat to enclose the first space; the second pivotal body includes a second pivotal seat and an arc-contoured second pivotal cap mounted on the second pivotal seat to enclose the second space.

3. The pivotal measuring wheel as claimed in claim 2, wherein the handle seat has a first pivotal sheet extending from the handle seat, being parallel to the first pivotal body and abutting against the second pivotal body; the joint seat has a second pivotal sheet extending from the joint seat, being parallel to the second pivotal body and abutting against the first pivotal body.

4. The pivotal measuring wheel as claimed in claim 3, wherein the handle seat has a locking member pivotally mounted on the handle seat; the joint seat has a locking recess defined in the joint seat for corresponding to the locking member.

5. The pivotal measuring wheel as claimed in claim 4, wherein the wheel seat has a stand pivotally mounted on one side of the wheel seat.

6. The pivotal measuring wheel as claimed in claim 5 further comprising a handlebar having two ends respectively and pivotally connected to two ends of a pintle between the handle seat and the joint seat.

7. The pivotal measuring wheel as claimed in claim 2, wherein the handle seat has a locking member pivotally mounted on the handle seat; the joint seat has a locking recess defined in the joint seat for corresponding to the locking member.

8. The pivotal measuring wheel as claimed in claim 2, wherein the wheel seat has a stand pivotally mounted on one side of the wheel seat.

9. The pivotal measuring wheel as claimed in claim 2 further comprising a handlebar having two ends respectively and pivotally connected to two ends of a pintle between the handle seat and the joint seat.

10. The pivotal measuring wheel as claimed in claim 3, wherein the wheel seat has a stand pivotally mounted on one side of the wheel seat.

11. The pivotal measuring wheel as claimed in claim 3 further comprising a handlebar having two ends respectively and pivotally connected to two ends of a pintle between the handle seat and the joint seat.

12. The pivotal measuring wheel as claimed in claim 4 further comprising a handlebar having two ends respectively and pivotally connected to two ends of a pintle between the handle seat and the joint seat.

13. The pivotal measuring wheel as claimed in claim 1, wherein the handle seat has a first pivotal sheet extending from the handle seat, being parallel to the first pivotal body and abutting against the second pivotal body; the joint seat has a second pivotal sheet extending from the joint seat, being parallel to the second pivotal body and abutting against the first pivotal body.

14. The pivotal measuring wheel as claimed in claim 1, wherein the handle seat has a locking member pivotally mounted on the handle seat; the joint seat has a locking recess defined in the joint seat for corresponding to the locking member.

15. The pivotal measuring wheel as claimed in claim 14, wherein the handle seat has a locking member pivotally mounted on the handle seat; the joint seat has a locking recess defined in the joint seat for corresponding to the locking member.

16. The pivotal measuring wheel as claimed in claim 14, wherein the wheel seat has a stand pivotally mounted on one side of the wheel seat.

17. The pivotal measuring wheel as claimed in claim 14 further comprising a handlebar having two ends respectively and pivotally connected to two ends of a pintle between the handle seat and the joint seat.

18. The pivotal measuring wheel as claimed in claim 1, wherein the wheel seat has a stand pivotally mounted on one side of the wheel seat.

19. The pivotal measuring wheel as claimed in claim 1 further comprising a handlebar having two ends respectively and pivotally connected to two ends of a pintle between the handle seat and the joint seat.

* * * * *